United States Patent
Desmarchelier et al.

(10) Patent No.: US 6,523,429 B2
(45) Date of Patent: Feb. 25, 2003

(54) MULTI SPEED POWER TAKE OFF

(75) Inventors: Emmanuel Desmarchelier, Villotran (FR); Philippe Baudet, Bailleul sur Therain (FR); Fabrice Collin, Beauvais (FR)

(73) Assignees: AGCO SA, Beauvais (FR); Renault Agriculture SA, Velizy Villacoublay (FR)

(*) Notice: Subject to any disclaimer, the term of this patent is extended or adjusted under 35 U.S.C. 154(b) by 10 days.

(21) Appl. No.: 09/826,385

(22) Filed: Apr. 4, 2001

(65) Prior Publication Data

US 2002/0043121 A1 Apr. 18, 2002

(30) Foreign Application Priority Data

Apr. 7, 2000 (GB) ............................................. 0008482

(51) Int. Cl.$^7$ ................................................. F16H 3/08
(52) U.S. Cl. .......................... 74/373; 74/15.4; 74/15.66; 74/392
(58) Field of Search ........................ 74/373, 331, 15.4, 74/15.66, 355, 392, 397; 180/900

(56) References Cited

U.S. PATENT DOCUMENTS

| | | | | |
|---|---|---|---|---|
| 4,208,923 A | * | 6/1980 | Ikegami ...................... 74/15.63 |
| 4,287,778 A | * | 9/1981 | Quick ........................ 192/87.18 |
| 4,373,597 A | * | 2/1983 | Itatani et al. ................. 74/15.4 |
| 4,658,662 A | | 4/1987 | Rundle ......................... 74/331 |
| 5,058,455 A | * | 10/1991 | Nemoto et al. ............ 74/606 R |
| 5,492,034 A | * | 2/1996 | Bogema et al. ............. 74/15.86 |
| 5,511,436 A | * | 4/1996 | Hasegawa et al. ............ 74/331 |
| 5,970,809 A | * | 10/1999 | Nam et al. ................... 74/15.4 |
| 6,190,280 B1 | * | 2/2001 | Horsch ........................ 475/209 |

FOREIGN PATENT DOCUMENTS

| | | | | |
|---|---|---|---|---|
| EP | 322368 | * | 6/1989 | ........... B60K/25/06 |
| GB | 2111926 | | 7/1983 | |
| GB | 2119330 | * | 11/1983 | ........... B60K/17/34 |

* cited by examiner

Primary Examiner—Sherry Estremsky
Assistant Examiner—Tisha D. Lewis
(74) Attorney, Agent, or Firm—MacMillan, Sobanski & Todd, LLC

(57) ABSTRACT

A power take off drive train for an agricultural tractor includes at least one input shaft and an output shaft that are rotatably mounted in a transmission casing, wherein the gear train provides for the output shaft to be rotated at one of three selected speeds, one of the at least one input shafts mounting first and second input gear wheels and a selector, the gear wheels being free to rotate on the shaft, and wherein the selector is mounted on the shaft for rotation therewith, and to slide axially along the shaft to engage with one of the first and second gear wheels transmitting torque thereto, and wherein the output shaft mounts first and second output gear wheels fixed for rotation therewith, the first and second output gear wheels being in driving engagement with the first and second input gear wheels respectively, and wherein the drive train further comprises a third output gear wheel that engages with a third input gear mounted on an input shaft mounted in the transmission casing, wherein drive to the output shaft through the third input and output gears is selectively engageable by a selector, and wherein the third output gear wheel is mounted on one of the first and second output gear wheels.

2 Claims, 2 Drawing Sheets

MULTI SPEED POWER TAKE OFF

FIELD OF THE INVENTION

This invention relates to a drive train for a power take off shaft, and particularly to a drive train for the power take off shaft of an agricultural tractor.

BACKGROUND OF THE INVENTION

Agricultural tractors are generally provided with at least one power take off shaft in order that implements, such as rotary harrows, fertilizer spreaders, sprayer pumps, balers, etc. may be driven.

Implement manufactures now manufacture tractors and implements to run at one of three standard speeds, namely, 540 rpm, 1000 rpm, and ground speed. The term "ground speed" means that the rate of rotation of the power take off shaft is proportional to the speed at which the tractor travels across the ground.

Since implements are manufactured to these standards, it is necessary for tractors to be provided with power take off shafts which rotate at the required speed. Power take off gear trains have been developed which provide for the selection of different speeds, eg 1000 rpm, 540 rpm, ground speed. Clearly, in the case of a fixed rotation speed, i.e. 1000 rpm, or 540 rpm, this can only be achieved at a certain engine speed. The manufacturer selects this speed, and usually a speed towards the maximum engine speed is selected, thereby permitting engine speed to fall as load on the power take off shaft increases.

Where the load on the power take off shaft is relatively low, the torque back up provided by running the engine at a high speed is not required. It is therefore not efficient to run the engine at high speed, but this is required in order for the power take off shaft to rotate at the required speed. In order to overcome this problem, manufacturers often provide what is known as a 540 rpm economy power take off shaft. Effectively, the gear train is arranged such that the power take off shaft runs at 540 rpm with an engine speed of about two thirds maximum speed, and as such the tractor's fuel economy improves axed the engine is quieter.

Gear trains for power take off shafts, where the power take off shaft can be selectively engaged to rotate at 540 rpm, 1000 rpm, and either ground speed or 540 rpm economy, are known. In one known gear train, separate power take off shafts are provided.

The power take off gear train is usually housed in a transmission casing. Space in such casings is limited. The invention provides an arrangement which.provides for selection of power take off output speed between 540 rpm, 1000 rpm, and either 540 economy, or ground speed using a small number of pats in a minimum of space.

Rated speed means the engine speed at which the power take off runs at the specified speed in revolutions per minute.

SUMMARY OF THE INVENTION

The invention provides a power take off drive train for an agricultural tractor, the drive train comprising at least one input shaft and an output shaft, said shafts being rotatably mounted in a transmission casing, wherein the gear train provides for the output shaft to be rotated at one of three selected speeds, one of the at least one input shafts mounting first and second input gear wheels and a selector, the gear wheels being free to rotate on the shaft, and wherein the selector is mounted on the shaft for rotation therewith, and to slide axially along the shaft to engage with one of the first and second gear wheels transmitting torque thereto, and wherein the output shaft mounts first and second output gear wheels fixed for rotation therewith, the first and second output gear wheels being in driving engagement with the first and second input gear wheels respectively, and wherein the drive train further comprises a third output gear wheel, which gear wheel engages with a third input gear wheel mounted on an input shaft mounted in the transmission casing, wherein drive to the output shaft through the third input and output gears is selectively engageable by means of a selector, and wherein the third output gear wheel is mounted on one of the first and second output gear wheels.

BRIEF DESCRIPTION OF THE DRAWINGS

In the drawings, which illustrate exemplary embodiments of the multi-speed power take off according to the invention.

DETAILED DESCRIPTION OF THE DRAWINGS

Figure 2:
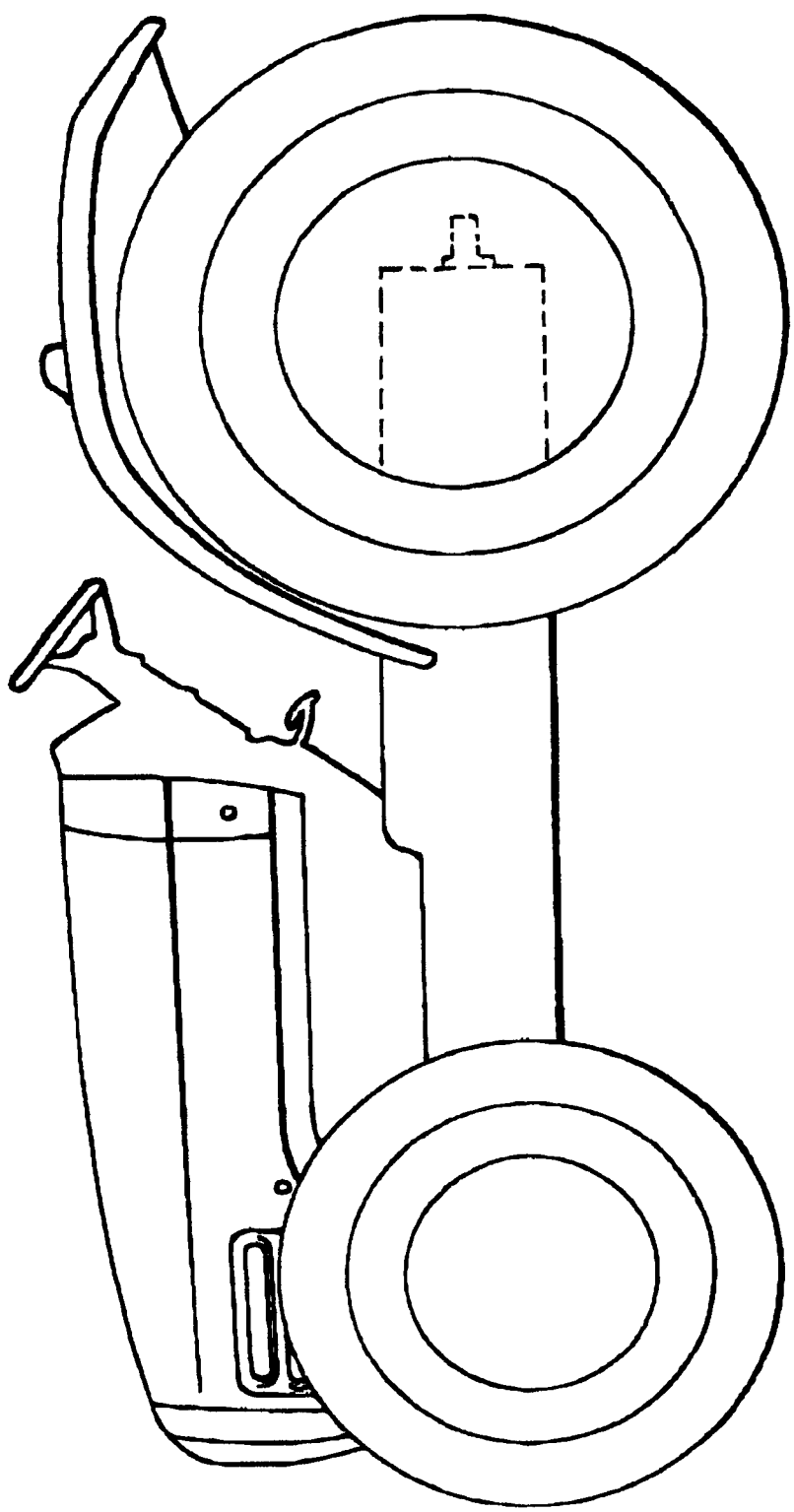
FIG. 2 is a schematic illustration of a tractor comprising a multi-speed power take off according to the invention.

FIG. 2 illustrates a tractor comprising an engine, a transmission, front and rear wheels, and a multi speed power take off drive train 1.

Figure 1:
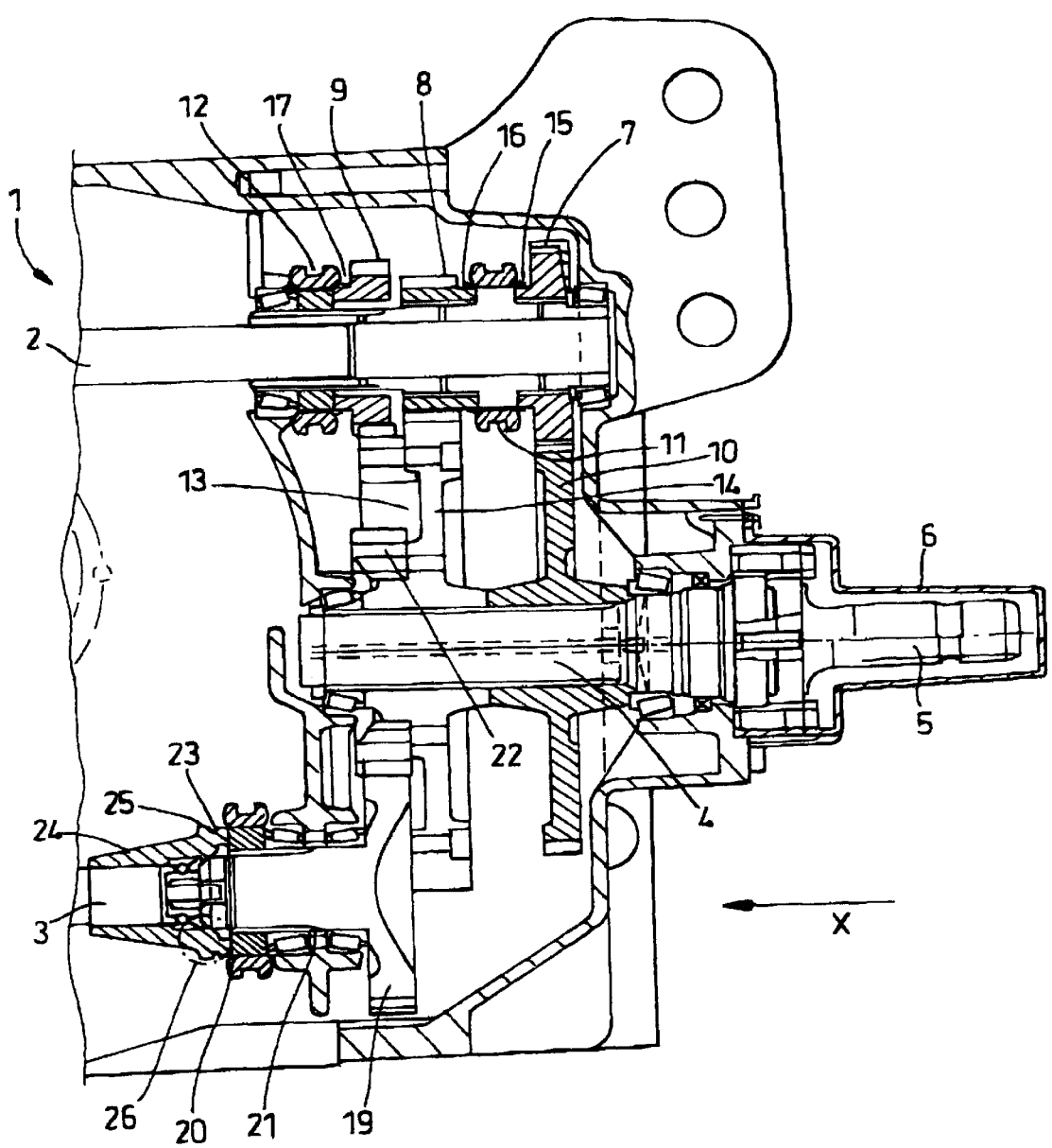
FIG. 1 is a cross-sectional view of a drive train comprising a multi-speed power take off according to the invention.

FIG. 1 illustrates two embodiments of the invention. In the first embodiment the drive train provides for output shaft 4 to be driven at 1000 rpm, 540 rpm, 540 rpm economy. In the second embodiment of the invention the drive train provides for the output shaft to be driven at 1000 rpm, 540 rpm or ground speed.

Referring now to FIG. 1, there is shown a power take off drive train illustrated generally at 1, comprising a first input shaft 2 drivingly connected to the engine via a transmission, which may comprise a plurality of selectable ratios, or a continuously variable transmission.

The drive train 1 further comprises a second input shaft 3. The input shaft 3 consists of the four-wheel drive shaft.

The power take off shaft of the drive train 1 consists of the shaft 4, and the splined stub shaft 5, which is attached to the output shaft 4. As can be seen from FIG. 1, the stub shaft 5 is enclosed by a cover 6. The cover 6 is removed when a machine to be driven by the tractor is attached to the stub shaft 5.

The input shaft 2 mounts three toothed gear wheels 7, 8, and 9. The teeth of gear 7 engage with the teeth of toothed gear wheel 10, which is attached to the output shaft 4, so that when torque is transmitted to the gear wheel 7 torque is transferred to the output shaft 4. The ratio of the gear 7 to gear 10 is such that the shaft 4 rotates at 1000 rpm at the tractor engine rotates at the rated speed. The teeth of gear 8 engage with the teeth of gear wheel 14, which is attached to the output shaft 4, so that when torque is transmitted to the gear wheel 8 torque is transferred to the output shaft 4. The teeth of gear 9 engage with the teeth of gear wheel 13, which is attached to the output shaft 4, so that when torque is transmitted to the gear wheel 9 torque is transferred to the output shaft 4.

The gears 7, 8, and 9 are mounted on the shaft 2 such that they rotate freely unless the tractor operator engages the power take off and selects the particular gear. Selection of the particular gear 7, 8 or 9 will now be described in greater detail, again with reference to FIG. 1. A selector 11 is slidably mounted on the input shaft 2. The selector is mounted on the input shaft 2 such that there can be no rotation between the two components Each of the faces of the selector 11 extending in the direction perpendicular to the axial direction of the input shaft 2 is in the form of teeth, and forms part of a dog clutch. The gear wheels 7 and 8 each comprise dog teeth on the faces of said wheels adjacent the selector 11 to form dog clutches 15 and 16.

The operation of the power take off drive train will now be described in more detail. It will be apparent from FIG. 1 that by sliding the selector to the right drive is engaged to the power take off via gears 7 and 10 so that the output shaft 4 rotates at 1000 rpm when the engine is set at the rated speed. By sliding the selector 11 to the left the dog clutch 16 is engaged and torque is transferred through the gear 8 via gear 14 to the output shaft, so that the output shaft rotates at 540 rpm.

The selector 11 has three positions; neutral with neither of the dog clutches 15 or 16 engaged, dog clutch 15 engaged, or dog clutch 16 engaged. The selector 11 must move through the neutral position, and therefore dog clutches 15 and 16 cannot be engaged simultaneously.

A selector 12 is slidably mounted on the shaft 2, again in a manner which does not permit rotation between the shaft 2 and the selector 12. In the same manner as described with reference to the selector 11 and gear wheels 7 and 8, the selector 12 and gear wheel 9 each comprise dog teeth so that the selector 12 and gear wheel 9 together form a dog clutch 17. When the selector 12 is moved to the right, the dog clutch 17 engages, and drive is transmitted to the output shaft 4 via the gear wheels 9 and 13 such that the output shaft rotates at 540 rpm when the engine speed is set at the rated speed for 540 economy.

DETAILED DESCRIPTION OF THE PREFERRED EMBODIMENT

When the 540 economy to is engaged the selector 11 is automatically moved to neutral.

The second embodiment of the invention will now be described with reference to FIG. 1. The drive train comprises the four wheel drive shaft 3, on which is mounted a toothed gear wheel 19. The toothed gear wheel 19 meshes with the toothed gear wheel 22, the gear 22 being fixed for rotation with the output shaft 4. The gear wheel 19 comprises a stub-shaft 21 extending in the direction "x", a selector 20 being slidably mounted on said stub shaft for rotation therewith. The selector 20 comprises dog teeth 23 which are selectively engageable with the dog teeth 25 of a coupler 24.

The ground speed power take off is engaged by moving the selector 20 so as to engage the dog clutch 26 which causes the gear 19 to rotate at the same speed as the four-wheel drive shaft. This in turn transmits torque to the gear 22 and hence the output shaft 4 rotates.

When the ground speed power take off is engaged the selector 11 is automatically moved to neutral.

In both the first and second embodiments, the gear wheel 13 is attached to the gear wheel 14. In the embodiment shown, this is achieved by bolting the gear wheel 13 to the gear wheel 14. This arrangement permits the drive train to be made more cheaply, with fewer parts than known power take off drive trains. The drive train occupies less space than known arrangements. Another benefit of this arrangement is that the procedure for assembling the drive train is simplified. The simplicity of the drive train of the invention allows the drive trains of existing tractors to be modified by the addition of a ground speed or 540 economy power take off.

What is claimed is:

1. A power take off drive train for an agricultural tractor comprising:

an input shaft;

first and second input gear wheels supported on said input shaft for rotation relative thereto;

a first selector supported on said input shaft for rotation therewith, said first selector being axially slidable along said input shaft for selectively connecting said first and second input gear wheels to said input shaft;

a third input gear wheel supported on said input shaft for rotation relative thereto;

a second selector supported on said input shaft for rotation therewith, said second selector being axially slidable along said input shaft for selectively connecting said third input gear wheel to said input shaft;

an output shaft adapted to be rotated at one of three selected speeds;

first and second output gear wheels supported on said output shaft for rotation therewith, said first and second output gear wheels respectively engaging said first and second input gear wheels; and a third output gear wheel supported on said output shaft for rotation therewith, said third output gear wheel being mounted on one of said first and second output gear wheels for rotation therewith, said third output gear wheel engaging said third input gear wheel.

2. A power take off drive train for an agricultural tractor comprising:

a first input shaft;

first and second input gear wheels supported on said first input shaft for rotation relative thereto;

a first selector supported on said first input shaft for rotation therewith, said first selector being axially slidable along said first input shaft for selectively connecting said first and second input gear wheels to said first input shaft;

a second input shaft;

a third input gear wheel supported on said second input shaft for rotation relative thereto;

a second selector supported on said second input shaft for rotation therewith, said second selector being axially slidable along said second input shaft for selectively connecting said third input gear wheel to said second input shaft;

an output shaft adapted to be rotated at one of three selected speeds;

first and second output gear wheels supported on said output shaft for rotation therewith, said first and second output gear wheels respectively engaging said first and second input gear wheels; and a third output gear wheel supported on said output shaft for rotation therewith, said third output gear wheel being mounted on one of said first and second output gear wheels for rotation therewith, said third output gear wheel engaging said third input gear wheel.

* * * * *